US012076726B2

(12) United States Patent
Ghirardi

(10) Patent No.: US 12,076,726 B2
(45) Date of Patent: Sep. 3, 2024

(54) ROTOR FOR A WASTE GRINDING APPARATUS AND WASTE GRINDING APPARATUS INCORPORATING SAID ROTOR

(71) Applicant: WPT S.R.L., Collegno (IT)

(72) Inventor: Simone Ghirardi, Rome (IT)

(73) Assignee: WPT S.R.L., Collegno (IT)

( * ) Notice: Subject to any disclaimer, the term of this patent is extended or adjusted under 35 U.S.C. 154(b) by 379 days.

(21) Appl. No.: 17/609,599

(22) PCT Filed: May 15, 2020

(86) PCT No.: PCT/IB2020/054623
§ 371 (c)(1),
(2) Date: Nov. 8, 2021

(87) PCT Pub. No.: WO2020/234722
PCT Pub. Date: Nov. 26, 2020

(65) Prior Publication Data

US 2022/0203373 A1 Jun. 30, 2022

(30) Foreign Application Priority Data

May 17, 2019 (IT) ........................ 102019000006950

(51) Int. Cl.
*B02C 13/28* (2006.01)
*B02C 13/30* (2006.01)
(Continued)

(52) U.S. Cl.
CPC .......... *B02C 13/2804* (2013.01); *B02C 13/30* (2013.01); *B02C 25/00* (2013.01)

(58) Field of Classification Search
CPC ... B02C 13/288; B02C 13/18; B02C 13/1804; B02C 13/26; B02C 19/0075;
(Continued)

(56) References Cited

U.S. PATENT DOCUMENTS 4,930,709 A 6/1990 Steffens
5,350,122 A 9/1994 Hundt et al.
(Continued)

FOREIGN PATENT DOCUMENTS

CN 202621227 U 12/2012
CN 103381379 A 11/2013
(Continued)

OTHER PUBLICATIONS

English translate (CN103071562B), retrieved date Jan. 11, 2024.*
(Continued)

*Primary Examiner* — Mohammed S. Alawadi
(74) *Attorney, Agent, or Firm* — Howson & Howson LLP

(57) ABSTRACT

A waste grinding apparatus (101) including a rotor having a central body (13) defining at least one radial vane (15*a*, 15*b*), provided, at its end (17*a*, 17*b*) distal relative to a rotation axis ("S") of the rotor (11), with a hammerhead (19) in which a first, knocker impact surface (21) adapted to operate when the rotor (11) rotates in a first, clockwise or counter-clockwise direction, and a second, wedge-shaped impact surface (23) adapted to operate when the rotor (11) rotates in a second direction opposite to the first direction, are defined.

8 Claims, 2 Drawing Sheets

(51) Int. Cl.

| | |
|---|---|
| ***B02C 18/00*** | (2006.01) |
| ***B02C 18/12*** | (2006.01) |
| ***B02C 18/14*** | (2006.01) |
| ***B02C 18/18*** | (2006.01) |
| ***B02C 25/00*** | (2006.01) |

(58) Field of Classification Search

CPC .......... B02C 2201/06; B02C 2018/162; B02C 18/16; B02C 18/0084

See application file for complete search history.

(56) References Cited

U.S. PATENT DOCUMENTS

| | | | | |
|---|---|---|---|---|
| 7,546,970 | B2 | 6/2009 | McNeil et al. | |
| 7,621,476 | B2 | 11/2009 | Jakobi et al. | |
| 10,933,425 | B2 | 3/2021 | Garin Rotondaro et al. | |
| 2009/0126582 | A1 | 5/2009 | Knecht et al. | |
| 2012/0291635 | A1 | 11/2012 | Ito et al. | |
| 2013/0233955 | A1 | 9/2013 | Morrow et al. | |
| 2016/0051851 | A1 * | 2/2016 | Bell .......................... | A61L 2/07 241/62 |

FOREIGN PATENT DOCUMENTS

| | | | | |
|---|---|---|---|---|
| CN | 204503260 | U | | 7/2015 |
| CN | 104895160 | A | | 9/2015 |
| CN | 103071562 | B | * | 1/2016 |
| CN | 205128068 | U | | 4/2016 |
| CN | 106334599 | A | | 1/2017 |
| CN | 1067378234 | A | | 2/2017 |
| CN | 106694114 | A | | 5/2017 |
| CN | 206240592 | A | | 6/2017 |
| CN | 206577849 | U | | 10/2017 |
| CN | 207756222 | U | | 8/2018 |
| CN | 109499700 | A | * | 3/2019 |
| DE | 19756635 | A1 | | 6/1998 |
| DE | 102007056124 | A1 | | 5/2009 |
| DE | 202017001459 | U1 | | 7/2017 |
| JP | 2007-245023 | A | | 9/2007 |
| WO | 2007/105235 | A1 | | 9/2007 |
| WO | 2007/125557 | A1 | | 11/2007 |

OTHER PUBLICATIONS

English translate (CN109499700A), retrieved date Jan. 11, 2024.*

International Search Report and Written Opinion of the International Searching Authority issued for International PCT Application No. PCT/IB2020/054623 on Nov. 5, 2020.

* cited by examiner

ROTOR FOR A WASTE GRINDING APPARATUS AND WASTE GRINDING APPARATUS INCORPORATING SAID ROTOR

TECHNICAL FIELD

The present invention relates to a waste grinding apparatus and to an apparatus incorporating said rotor. More particularly, but not exclusively, the invention relates to a rotor and a waste grinding apparatus for processing waste in remote environments such as, for example, on board vessels, on oil platforms and the like. The invention lends itself to the processing of waste of substantially any nature, whether undifferentiated waste, waste from recycling sorting and special waste such as hospital waste or waste from industrial processes.

PRIOR ART

An example of a grinding apparatus equipped with a rotor is described in DE202017001459 (U1). This type of apparatus mainly comprises a grinding cell in which the waste to be processed is subjected to a grinding and shredding step. The cell typically consists of a cylindrical vessel open at the top and provided with a lid. A cutting unit, comprising a rotor equipped with rotating blades driven by an electric motor, is arranged inside the cell. In these apparatuses, the material to be processed, for example hospital waste, is loaded into the cell from above, after the lid has been opened. Thereafter, the lid is closed and the blades are driven to perform the intended processing. After the processing, the solid material which has formed within the cell is removed through a lower opening and, subsequently, the upper cover of the cell is opened to allow loading a new batch of waste.

The apparatuses of known type, which provide for the grinding of waste thanks to the action of rotors arranged inside the chamber defined in the processing cell, are affected by frequent blockages and interruptions due to the so-called phenomenon of jamming, i.e. the excessive and localised accumulation of shredded material. Many attempts have been made in the past to solve this problem, but the solutions adopted thus far have not been satisfactory.

One problem that the present invention aims to solve is therefore how to avoid said jamming, while retaining a high grinding and shredding capacity on any type of waste.

A further object of the invention is to provide a rotor and a grinding apparatus, which is reliable and safe and can be manufactured industrially at reasonable cost.

The rotor of the waste grinding apparatus made in accordance with a preferred embodiment of the invention mainly comprises a central body defining at least one radial vane provided, at its end distal relative to the rotation axis of the rotor, with a hammerhead. Advantageously, according to the invention at least one pair of impact surfaces are defined in the hammerhead. Preferably, said surfaces comprise at least a first, knocker impact surface and a second, wedge-shaped impact surface, substantially opposite the first surface. According to a preferred embodiment of the invention, the first, knocker impact surface is adapted to operate when the rotor rotates in a first, clockwise or counter-clockwise direction. The second, wedge-shaped impact surface is adapted to operate when the rotor rotates in a second direction opposite to the first direction.

In a preferred embodiment of the invention, the first, knocker impact surface extends on a single plane. Furthermore, the plane on which the knocker impact surface extends is preferably substantially perpendicular to the angular direction of rotation of the rotor. Said plane is also preferably substantially parallel to the rotation axis of the rotor. Preferably said plane is furthermore tangent to an imaginary cylinder with its axis coinciding with the rotation axis of the rotor and contained in the body of the rotor, i.e., with the generatrices intercepting the body of the rotor. Alternatively, said plane on which the first surface extends is passing through the rotation axis of the rotor. In other embodiments said plane may assume various inclinations relative to the plane of rotation of the rotor. Preferably the possible inclination of the plane on which said first surface extends is between 15° and 90°. Advantageously, according to the invention, the first surface is configured so that, when the rotor rotates clockwise or counter-clockwise for making the first surface impact against the material contained in a cell of a grinding apparatus, said first impact surface is arranged so as to maximize the impact effect and consequently the temperature raise on the waste material contained in the cell.

Still in accordance with a preferred embodiment of the invention, the second, wedge-shaped impact surface extends on at least a pair of planes, inclined relative to the plane of rotation of the rotor and inclined relative to each other. Still more preferably, said surface extends on a pair of planes inclined relative to each other and relative to the plane of rotation of the rotor, configured so that the angle of inclination of said planes is preferably between about 15° and 90° and even more preferably between 30° and 45° relative to the plane of rotation. Moreover, said two planes on which the second surface extends are preferably inclined relative to each other at an angle between 90° and 180° and even more preferably between about 120° and 130°.

Advantageously, according to the invention, the second surface is configured so that, when the rotor rotates clockwise or anticlockwise for making the second surface impact against the material contained in a cell of a grinding apparatus, said second impact surface is arranged so as to cause a cutting effect on the waste material contained in the cell, so as to promote the grinding and shredding of said material.

The rotor according to the invention has advantageous industrial application in a grinding apparatus comprising a grinding cell, preferably cylindrical, in which at least one rotor can be housed.

According to a particular embodiment of the invention, the rotor housed in the cell is preferably driven by an electric motor located outside the cell and controlled by an electronic unit. Advantageously, the electronic unit is preferably programmed for allowing the rotor housed in the cell to carry out at least two working cycles. In a first working cycle the rotor is driven in a first direction, clockwise or counter-clockwise, and, in a second working cycle, the rotor is driven in a second direction opposite to the first direction, i.e. counter-clockwise or clockwise respectively.

Even more preferably, the first working cycle is carried out with the knocker impact surface of the hammerhead of the at least one rotor vane. That is, in the first working cycle the rotor is rotated so as to make the knocker impact surface of the vane work. In a preferred embodiment of the invention, in which the rotor is provided with a pair of diametrically opposite vanes, each equipped with a hammerhead provided with opposing surfaces, respectively knocker and wedge-shaped impact surface, said surfaces are configured so that when the rotor rotates in a first direction, both knocker surfaces are oriented in the same direction and accordingly work simultaneously.

Still in accordance with this even more preferred embodiment of the invention, the second working cycle is carried out with the wedge-shaped surface of the hammerhead of the at least one rotor vane. That is, in the second working cycle the rotor is rotated so as to make the wedge-shaped surface of the vane work. In a preferred embodiment of the invention, in which the rotor is provided with a pair of diametrically opposite vanes, each equipped with a hammerhead provided with opposing surfaces, respectively knocker and wedge-shaped impact surface, said surfaces are configured so that when the rotor rotates in a second direction, both wedge-shaped surfaces are oriented in the same direction and accordingly work simultaneously.

In a particular embodiment of the invention, the control unit is programmed for keeping the rotational speed of the electric motor constant during the first working cycle, and for maintaining the torque exerted by the electric motor constant during the second working cycle. In the first working cycle, the electric motor is advantageously powered at constant voltage and, in the second working cycle, is powered so as to maintain the absorbed current substantially constant.

Advantageously, the provision of the two working cycles, the first mainly aimed at raising the temperature of the waste and the second mainly aimed at causing the cutting and shredding of waste, allows to obtain an effective result of grinding the waste with a high operating efficiency that results in lower management and maintenance costs.

The invention is also particularly advantageous for avoiding the jamming phenomenon in the cells of the grinding apparatuses and for increasing the operating efficiency to the benefit of the operating and maintenance costs of a waste processing plant incorporating a grinder equipped with a rotor according to the invention.

SYNTHETIC DESCRIPTION OF THE FIGURES

Some preferred embodiments of the invention will be described below by way of non-limiting example with reference to the accompanying figures in which.

The same references were used in all the figures to distinguish equal or functionally equivalent components.

DESCRIPTION OF SOME PREFERRED EMBODIMENTS OF THE INVENTION

Figure 1:
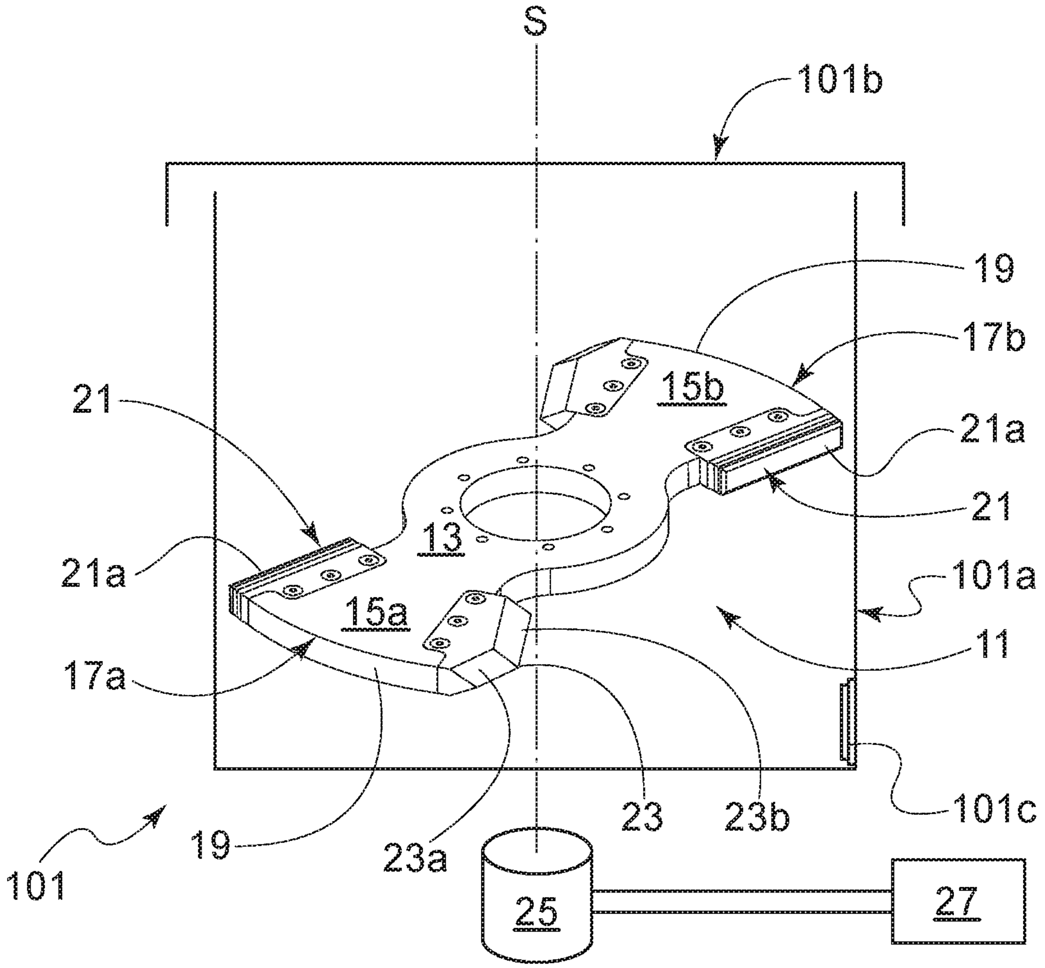
FIG. 1 is a simplified schematic view of a grinding apparatus incorporating a rotor made according to a preferred embodiment of the invention.

Referring to FIG. 1, reference 11 is used to indicate the rotor according to the invention and reference 101 is used to indicate a waste grinding apparatus provided with a grinding cell 101*a* provided with an opening lid 101*b* at the top and with an unloading mouth 101*c* at the base. In the figure, the rotor 11 is shown seen from above inside the cell 101*a* of the grinding apparatus 101. The rotor 11 is preferably positioned near the lower base of the cell 101*a*, however, in other embodiments the rotor 11 may be positioned at different heights and multiple rotors 11 may be provided in the same grinding cell.

The rotor 11 comprises a central body 13 defining at least one radial vane 15*a*, 15*b* provided, at its end 17*a*, 17*b* distal relative to the rotation axis "S" of the rotor 11, with a hammerhead 19. In the example shown, a first, knocker impact surface 21, adapted to operate when the rotor rotates in a first, clockwise direction, and a second, wedge-shaped impact surface 23, adapted to operate when the rotor 11 rotates in a second direction opposite to the first, counter-clockwise in the example shown, are defined in the hammerhead 19.

The first, knocker impact surface 21 extends on a single plane 21*a* parallel to the rotation axis "S" of the rotor 11. Furthermore, in the example shown, the plane 21*a* on which the knocker impact surface 21 extends is substantially perpendicular to the angular direction of rotation of the rotor. More precisely, in the embodiment shown, said plane is furthermore tangent to an imaginary cylinder with its axis coinciding with the rotation axis "S" of the rotor 11 and contained in the rotor body, i.e., with the generatrices of said imaginary cylinder intercepting the body of the rotor.

The second, wedge-shaped impact surface 23 extends on a pair of planes 23*a*, 23*b* inclined relative to the plane of rotation of the rotor 11 perpendicular to the rotation axis "S". In addition, the planes 23*a*, 23*b* are inclined relative to each other.

Figure 2:
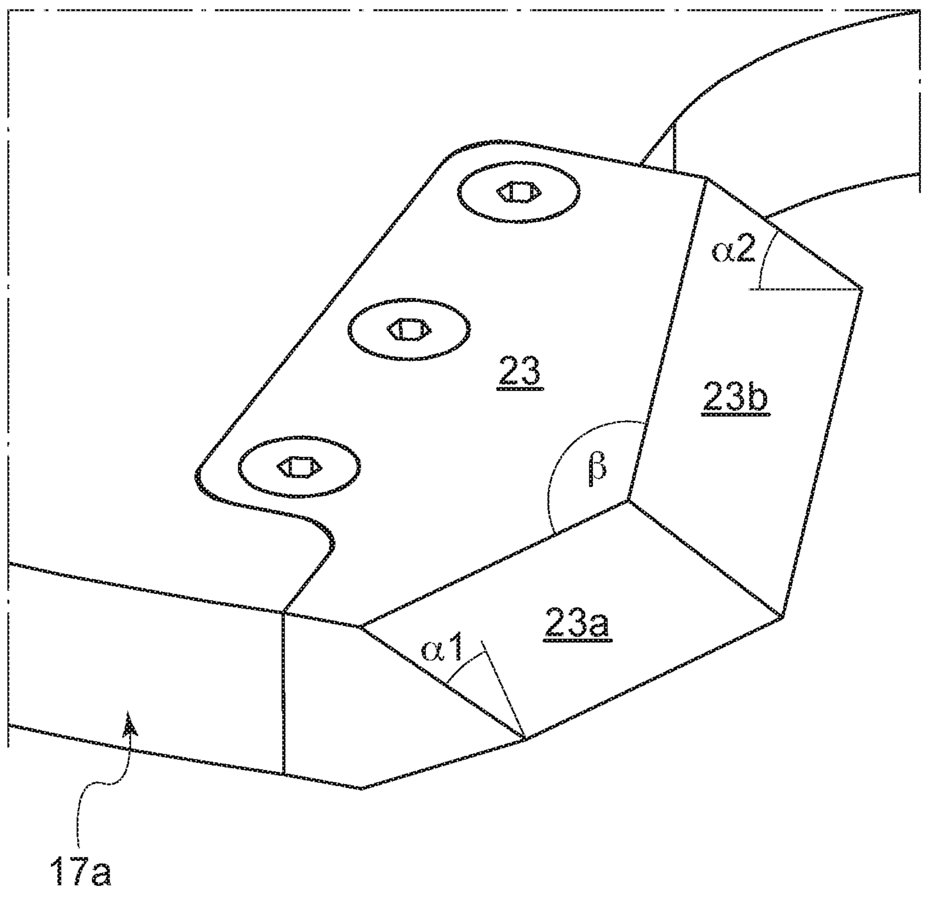
FIG. 2 is an enlarged view of a detail of FIG. 1.

As can be better appreciated from FIG. 2, in the example shown, said two planes 23*a*, 23*b* on which the second surface 23 extends are inclined at a corresponding angle $\alpha_1$, $\alpha_2$ between 15° and 90°, preferably about 30° with respect to the plane of rotation. Moreover, said two planes 23*a*, 23*b* on which the second surface 23 extends are inclined at an angle $\beta$ between 90° and 180° relative to each other.

Referring again to FIG. 1, the rotor 11 is driven by an electric motor 25 controlled by an electronic unit 27 programmed for allowing the rotor 11 to carry out a first working cycle, in which the rotor 11 rotates in a first direction, clockwise or counter-clockwise, and a second working cycle, in which the rotor 11 rotates in a second direction opposite to the first direction.

The first working cycle is carried out with the knocker impact surface 21 of the hammerhead 19 of the at least one vane 15*a*, 15*b* of the rotor 11 and the second working cycle is carried out with the wedge-shaped surface 23 of said hammerhead 19.

The control unit 27 is preferably programmed for keeping the rotational speed of the electric motor 25 constant during the first working cycle, and for maintaining the torque exerted by the electric motor 25 constant during the second working cycle. The constant torque is preferably maintained by comparing the current absorbed by the electric motor with a predetermined threshold.

INDUSTRIAL APPLICABILITY

The rotor according to the invention is adapted to operate with a wide range of waste, from undifferentiated waste to separate recyclable materials and special waste of industrial or hospital origin.

The invention claimed is:

1. A waste grinding apparatus (101) for processing a waste material, comprising:

a rotor (11) having a central body (13) defining at least one radial vane (15*a*, 15*b*), provided, at its end (17*a*, 17*b*) distal relative to a vertical rotation axis ("S") of the rotor (11), with a hammerhead (19) in which a first, knocker impact surface (21) adapted to operate when the rotor (11) rotates in a first, clockwise or counter-clockwise direction, and a second, wedge-shaped impact surface (23) adapted to operate when the rotor (11) rotates in a second direction opposite to the first direction, are defined; and a grinding cell (101*a*) in which the rotor (11) is housed;

wherein the first, knocker impact surface (21) extends on a single plane (21*a*) parallel to the vertical rotation axis of the rotor or substantially perpendicular to an angular direction of rotation of the rotor;

wherein the rotor (11) is driven by an electric motor (25) controlled by an electronic unit (27) programmed for causing the rotor (11) to carry out a first working cycle, in which the rotor (11) rotates in the first direction, either clockwise or counter-clockwise, and a second working cycle, in which the rotor (11) rotates in the second direction opposite to the first direction; and wherein the first working cycle raises a temperature of the waste material and is carried out with the knocker impact surface (21) of the hammerhead (19) of the at least one vane (15*a*, 15*b*) of the rotor (11), and the second working cycle cuts and shreds the waste material and is carried out with the wedge-shaped surface (23) of the hammerhead (19).

2. The waste grinding apparatus (101) according to claim 1, wherein the second, wedge-shaped impact surface (23) extends on a pair of planes (23*a*, 23*b*) inclined relative to a plane of rotation of the rotor (11) as well as inclined relative to each other.

3. The waste grinding apparatus (101) according to claim 2, wherein said pair of planes (23*a*, 23*b*) on which the second impact surface (23) extends are inclined at an angle (β) between 90° and 180° relative to each other.

4. The waste grinding apparatus (101) according to claim 2, wherein said pair of planes (23*a*, 23*b*) on which the second impact surface (23) extends are inclined at an angle (α1, α2) between 15° and 90° relative to the plane of rotation of the rotor (11).

5. The waste grinding apparatus (101) according to claim 4, wherein said pair of planes (23*a*, 23*b*) on which the second impact surface (23) extends are inclined at an angle (α1, α2) of 30° relative to the plane of rotation of the rotor (11).

6. The waste grinding apparatus (101) according to claim 5, wherein said pair of planes (23*a*, 23*b*) on which the second impact surface (23) extends are inclined at an angle (β) between 90° and 180° relative to each other.

7. The waste grinding apparatus (101) according to claim 4, wherein said pair of planes (23*a*, 23*b*) on which the second impact surface (23) extends are inclined at an angle (β) between 90° and 180° relative to each other.

8. The waste grinding apparatus (101) according to claim 1, wherein the electronic unit (27) is programmed for keeping rotational speed of the electric motor (25) constant during the first working cycle, and for maintaining torque exerted by the electric motor (25) constant during the second working cycle.

* * * * *